Inventor
Fritz Janke
BY
a. M. Neiter
Attorney

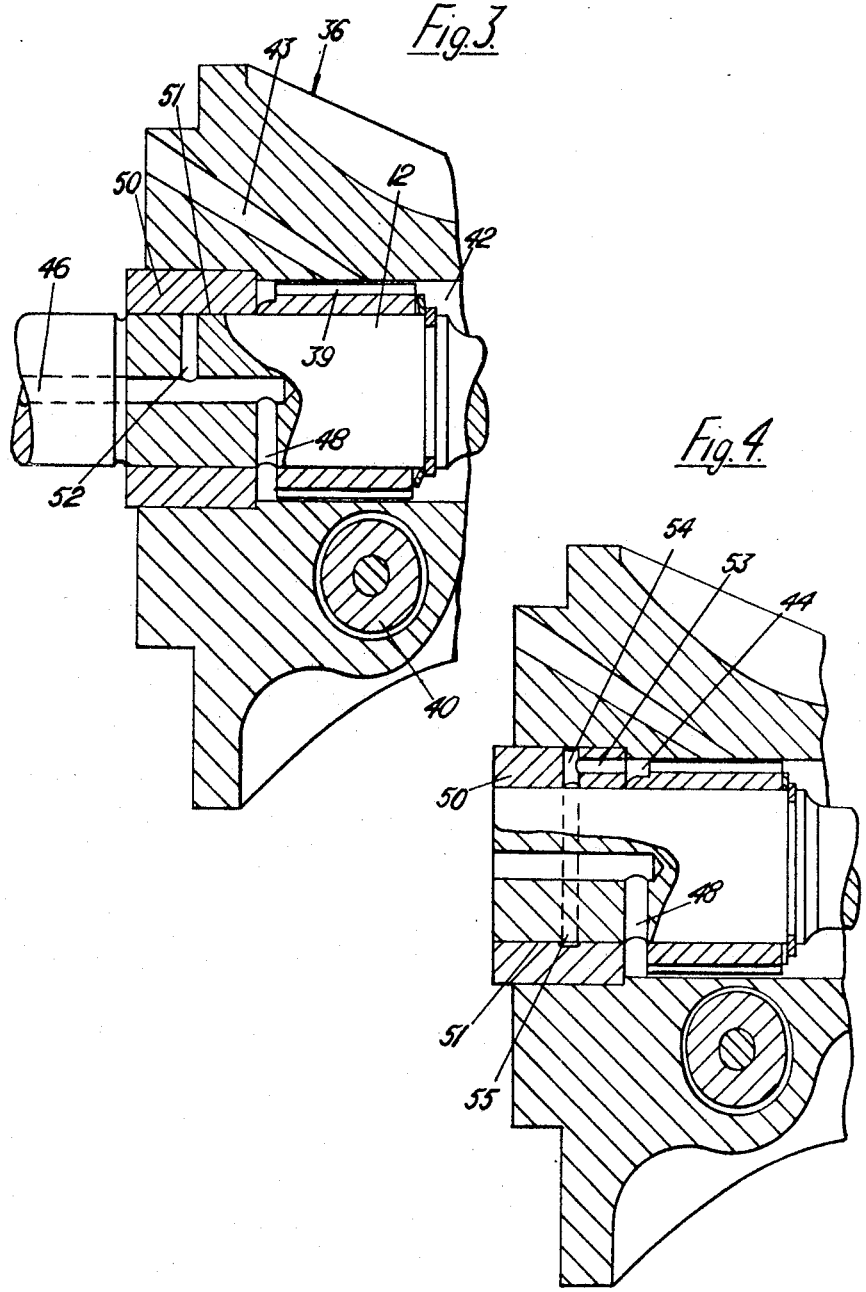

United States Patent Office 3,467,221
Patented Sept. 16, 1969

3,467,221
LUBRICATING ARRANGEMENTS FOR MOTOR
VEHICLE CHANGE-SPEED GEARING
Fritz Janke, Russelsheim (Main), Germany, assignor to
General Motors Corporation, Detroit, Mich., a corporation of Delaware
Filed Sept. 11, 1967, Ser. No. 666,754
Claims priority, application Germany, Sept. 28, 1966,
11,984
Int. Cl. F16n 29/02
U.S. Cl. 184—6
11 Claims

ABSTRACT OF THE DISCLOSURE

A lubricating arrangement for motor vehicle change-speed gearing utilises the helically toothed speedometer drive pinion as a rotary pump for forwarding lubricant from a lubricant supply passage in the gearing casing simultaneously to a plurality of rotary bearing surfaces of the change-speed gearing.

This invention relates to lubricating arrangements for motor vehicle change-speed gearing.

An object of the invention is to achieve more efficient lubrication than is possible with ordinary dip lubrication, but without the complication inherent in conventional circulatory pressure-feed lubricating arrangements, and further to achieve this result merely by small changes in various components of the conventional change-speed gearing.

A further object of the invention is to ensure an adequate and continuous supply of lubricant simultaneously to a plurality of bearing surfaces of the change-speed gearing during operation of the change-speed gearing.

These and further objects are attainable by a lubricating arrangement in accordance with the invention this lubricating arrangement, for rotary bearing surfaces of change-speed gearing of a motor vehicle, comprising a rotary driven shaft of the change-speed gearing, a speedometer drive pinion which is fixed to the rotary shaft and has helical teeth meshing with teeth of a speedometer driven gear, a casing portion surrounding the speedometer drive pinion, a lubricant supply passage arranged in the casing portion and leading to an annular space between the casing portion and the speedometer drive pinion, an annular collector chamber which is in fluid communication with the annular space and is arranged to be supplied with lubricant therefrom by a pumping action resulting from rotation of the speedometer drive pinion relatively to the surrounding casing portion, and passages arranged in the rotary shaft for forwarding lubricant from the annular chamber simultaneously to a plurality of rotary bearing surfaces of the change-speed gearing.

Conveniently, a collector baffle is arranged within the gearing casing for directing lubricant thrown up by rotation of the change-speed gears to the end of the lubricant supply passage remote from the speedometer drive pinion.

These and further features and advantages of the invention will be apparent from the following description of a few embodiments, with reference to the accompanying drawings, in which:

FIG. 3 is a fragmentary longitudinal section on the line IIa—IIa of FIG. 1 but showing a tailshaft portion which is modified as compared with FIG. 2, with a mainshaft being journalled in a plain bearing; and FIG. 4 is a fragmentary longitudinal section similar to FIG. 3 but showing a different circuit for lubricant oil.

Figure 1:
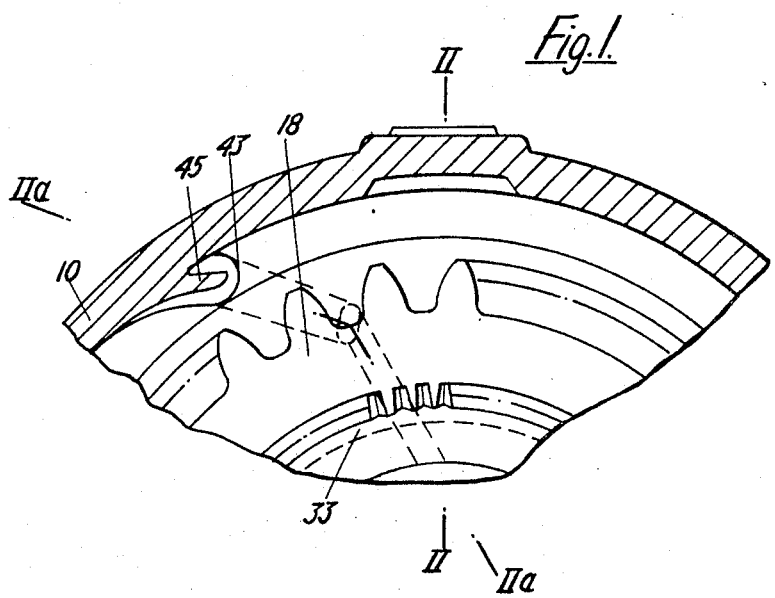
FIG. 1 is a fragmentary cross-section on the line I—I of FIG. 2, in the direction of the arrows.
Figure 2:
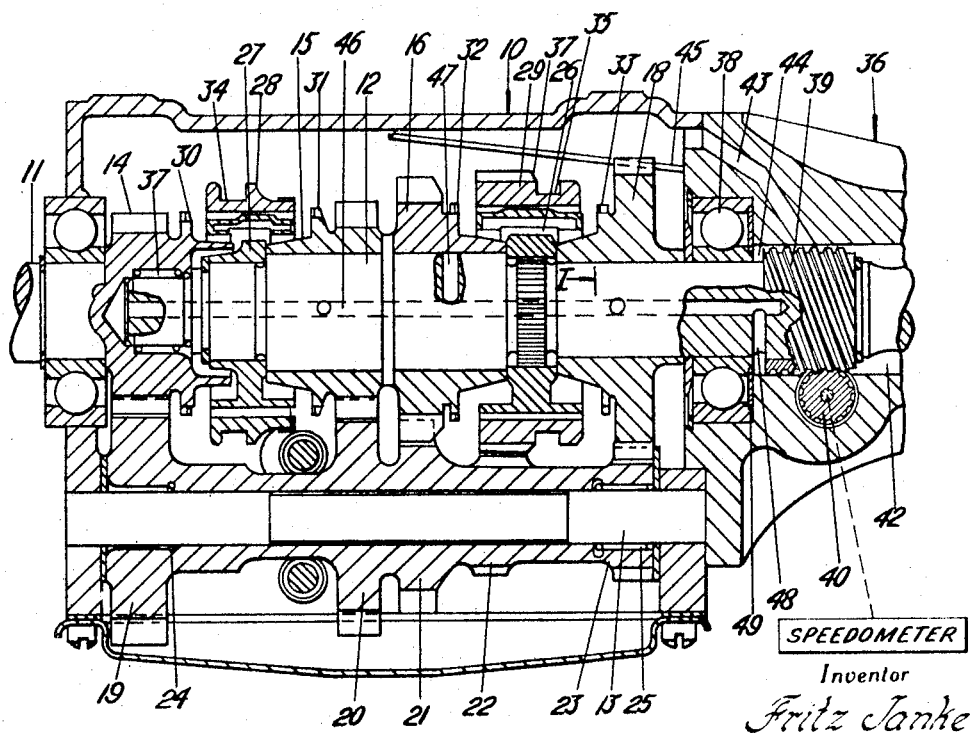
FIG. 2 is a somewhat reduced longitudinal section on the lines II—II of FIG. 1, in the direction of the arrows, in the region of four-speed gearing, and a longitudinal section on the line IIa—IIa of FIG. 1, in the direction of the arrows, in the region of a tailshaft portion of the change-speed gearing.

In the embodiment shown in FIGS. 1 and 2, mounted in a gearing casing 10 of conventional change-speed gearing of a motor vehicle there are an input shaft 11 and a spindle 13 for a hollow layshaft (countershaft). The input shaft 11 includes an integral toothed gear 14. A mainshaft 12 is mounted, coaxially with the input shaft 11, at one end in a hollow at the rear end of the input shaft 11, and at the other end in a tail-piece portion 36 of the change-speed gearing casing, by means of bearings 37 and 38 respectively.

Toothed gears 15, 16 and 18 are mounted non-slidably, but freely rotatably, on the main shaft 12. The hollow layshaft is mounted on the spindle 13 by conventional roller bearings 24 and 25, and includes toothed gears 19, 20, 21, 22 and 23. Of these layshaft gears, the gear 19 meshes with the gear 14 on the input shaft 11, and the gears 20, 21 and 23 are in constant meshing engagement with the corresponding gears 15, 16 and 18 mounted on the mainshaft.

The mainshaft 12 further carries two slidable shift-sleeve carriers 26 and 27, which are splined both internally and externally, and carry respective internally splined slidable shift sleeves 29 and 28. The shift sleeve 28 can co-operate selectively with sets 30 and 31 of positive-clutch teeth, and the shift sleeve 29 can co-operate selectively with sets 32 and 33 of positive-clutch teeth, with the aid of conventional synchroniser devices.

The shift sleeves 28 and 29 have circumferential grooves 34 and 35 for co-operation with conventional gear shifter forks (not shown). The shift sleeve 29 also carries a toothed gear 37 which, for engaging reverse, can be connected to the gear 22 on the hollow layshaft by sliding a conventional idler gear (not shown).

The four-speed gearing, which as so far described is of conventional construction, is shown in its neutral position. During gear changes in the sequence from 1st speed to 4th, the toothed gears 18, 16, 15 and the input shaft 11 are successively positively connected to the mainshaft 12 by means of the shift sleeves 29 and 28 and their carriers 26 and 27.

The output end of the gearing casing 10 is extended by the tail-piece portion 36, the front wall of which accommodates the ball-bearing 38 forming the rear bearing for the mainshaft 12. Immediately adjacent the ball-bearing 38, a helically toothed speedometer drive pinion 39 is fixed to the mainshaft 12, and meshes with a speedometer driven gear to operate a speedometer in conventional manner by way of a speedometer driveshaft or cable 40. The diameter of a central bore 42 of the tail-piece 36 is slightly greater than that of the speedometer drive pinion 39, so that the casing portion surrounding the speedometer drive pinion 39 is slightly spaced from the drive gear 39. The wall of the casing portion formed by the tail-piece 36 is provided with a lubricant supply passage 43 which leads from the left-hand side wall of the gearing casing 10, with a slightly falling gradient, to the annular space surrounding the speedometer drive pinion 39. Axially between the pinion 39 and the ball-bearing 38 there is an annular collector chamber 44 which coaxially surrounds the mainshaft and is supplied with lubricant oil from the speedometer drive gear by a pumping action resulting from rotation of the drive gear relatively to the surrounding casing portion.

A collector baffle 45 in the form of a rib is arranged inside the rear portion of the gearing casing: it discharges into the lubricant supply passage 43 with a falling gradient. Lubricant oil thrown upwards by the gears in the rear portion of the gearing casing 10, is caught by the collector baffle 45 and directed to the end of the lubricant supply passage 43 remote from the speedometer drive pinion as a result of the kinetic energy of the oil thrown upwards.

The mainshaft 12 has a longitudinal central bore 46. From this axial bore, transverse bores 47 leading to the individual bearing surfaces branch off in a radial direction. There is also a radial bore 48 connecting the annular collector chamber 44 to the central bore 46 of the mainshaft 12.

The oil which is thrown upwards flows away from the collector baffle 45 with appreciable speed, with the kinetic energy of the lubricant oil being converted into a pressure head in the passage 43. Under the action of this pressure head, the oil flows into the region adjacent the helical teeth of the speedometer drive pinion 39, and is propelled by the rotary movement of these teeth forwards into the annular collector chamber 44, from where it is forwarded into the central bore 46 of the mainshaft 12. The pumping pressure created by the rotation of the speedometer drive pinion is sufficient to force the lubricant oil as far as the bearings at the front end of the mainshaft. A sealing washer 49 prevents escape of lubricant oil by way of the ball-bearing 38 back into the gearing casing 10.

From the radial bores such as the bore 47, the lubricant oil passes to the bearings, distributes itself over the entire bearing surface, and then escapes at the flanks of the gears and passes again into the oil circulation. In this way the sliding faces, as well as the flanks of the gears, are lubricated.

FIGS. 3 and 4 illustrate embodiments in which the rear ball-bearing 38 has been replaced by a plain bearing 50. In the embodiment shown in FIG. 3, lubrication of the bearing surface 51 takes place as described above, through a radial bore 52 which is connected to the central longitudinal bore 46. In the embodiment shown in FIG. 4, however, the plain bearing 50 also includes an axial bore 53 which connects the annular collector chamber to a radial bore 54 and leads to a circumferential oil groove 55 provided in the plain bearing. Lubricant oil is thus able to pass directly out of the annular collector chamber 44 into the oil groove 55 and from there to the bearing surface 51.

The invention thus having been described, what is claimed is:

1. A lubricating arrangement for rotary bearing surfaces of change-speed gearing of a motor vehicle, comprising a rotary driven shaft of the change-speed gearing, a speedometer drive pinion which is fixed to the rotary shaft and has helical teeth meshing with teeth of a speedometer driven gear, a casing portion surrounding the speedometer drive pinion, a lubricant supply passage arranged in the casing portion and leading to an annular space between the casing portion and the speedometer drive pinion, an annular collector chamber which is in fluid communication with the annular space and is arranged to be supplied with lubricant therefrom by a pumping action resulting from rotation of the speedometer drive pinion relatively to the surrounding casing portion, and passages arranged in the rotary shaft for forwarding lubricant from the annular chamber simultaneously to a plurality of rotary bearing surfaces of the change-speed gearing.

2. A lubricating arrangement according to claim 1, also including a speedometer arranged to be operated by rotation of the speedometer driven gear.

3. A lubricating arrangement according to claim 1, wherein a collector baffle is arranged within the gearing casing for directing lubricant thrown up by rotation of the change-speed gears to the end of the lubricant supply passage remote from the speedometer drive pinion.

4. A lubricating arrangement according to claim 1, wherein the rotary driven shaft to which the speedometer drive pinion is fixed comprises a tailshaft portion of a driven mainshaft of the change-speed gearing.

5. A lubricating arrangement according to claim 1, wherein the passages arranged in the rotary driven shaft comprise longitudinally and transversely extending bores.

6. A lubricating arrangement according to claim 5, wherein the annular collector chamber leads via a radially extending bore into a bore which extends axially of the rotary driven shaft and is in turn connected by radially extending bores to the various rotary bearing surfaces to be lubricated.

7. A lubricating arrangement according to claim 1, wherein the annular collector chamber coaxially surrounds the rotary driven shaft at a position immediately axially adjacent the helical teeth of the speedometer drive pinion.

8. A lubricating arrangement according to claim 7, wherein the annular collector chamber is disposed axially between the helical teeth of the speedometer drive pinion and a bearing for the rotary driven shaft.

9. A lubricating arrangement according to claim 8, wherein the bearing for the rotary driven shaft is constructed as a plain bearing and is arranged to be supplied with lubricant directly from the annular collector chamber.

10. In a motor vehicle having change-speed gearing including a mainshaft to a tailshaft portion to which is fixed a speedometer drive pinion having helical teeth meshing with teeth of a speedometer driven gear connected to operate a speedometer, an improved lubricating arrangement which comprises a lubricant supply passage leading to an annular space between the speedometer drive pinion and a surrounding casing portion, an annular collector chamber which is in fluid communication with said annular region and is arranged to be supplied with lubricant therefrom by a pumping action resulting from rotation of the speedometer drive pinion relatively to the surrounding casing portion, and passages arranged in the mainshaft for forwarding lubricant from the annular chamber simultaneously to a plurality of rotary bearing surfaces of the change-speed gearing.

11. A lubricating arrangement according to claim 10, wherein a collector baffle is arranged within the gearing casing for directing lubricant thrown up by rotation of the change-speed gears to the end of the lubricant supply passage remote from the speedometer drive pinion.

References Cited

UNITED STATES PATENTS

| 1,850,340 | 3/1932 | Cowles. |
| 1,915,330 | 6/1933 | Morrill. |
| 1,988,440 | 1/1935 | Cotterman _____ 184—6 X |

FOREIGN PATENTS

| 629,052 | 9/1949 | Great Britain. |

HALL C. COE, Primary Examiner